(12) United States Patent
Lee et al.

(10) Patent No.: US 10,760,561 B2
(45) Date of Patent: Sep. 1, 2020

(54) SOLENOID VALVE HAVING VENTILATION STRUCTURE

(71) Applicant: HYUNDAI KEFICO CORPORATION, Gunpo, Gyeonggi-do (KR)

(72) Inventors: Jae Kyung Lee, Gyeonggi-do (KR); Ho Yeon Kim, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 22 days.

(21) Appl. No.: 15/995,996

(22) Filed: Jun. 1, 2018

(65) Prior Publication Data
US 2018/0347554 A1 Dec. 6, 2018

(30) Foreign Application Priority Data
Jun. 5, 2017 (KR) .................. 10-2017-0069457

(51) Int. Cl.
*F16K 31/06* (2006.01)
*F04B 35/04* (2006.01)
(Continued)

(52) U.S. Cl.
CPC ............ *F04B 35/045* (2013.01); *F04B 39/10* (2013.01); *F16K 3/24* (2013.01); *F16K 31/06* (2013.01);
(Continued)

(58) Field of Classification Search
CPC .. F16K 31/06; F16K 31/0603; F16K 31/0613; F16K 31/0693; F16K 31/0675;
(Continued)

(56) References Cited

U.S. PATENT DOCUMENTS 5,255,855 A * 10/1993 Maier ................ F02M 51/0614
239/585.4
5,558,311 A * 9/1996 Connolly ............ B60R 16/0207
251/129.15
(Continued)

FOREIGN PATENT DOCUMENTS

| JP | 2003-329164 A | 11/2003 |
| KR | 20130047447 A | 5/2013 |
| KR | 101561867 B1 | 10/2015 |

OTHER PUBLICATIONS

Translation of KR101561867 (Year: 2019).*

*Primary Examiner* — Kelsey E Cary
(74) *Attorney, Agent, or Firm* — Mintz Levin Cohn Ferris Glovsky and Popeo, P.C.; Peter F. Corless (57) ABSTRACT

The present disclosure relates to a solenoid valve having a ventilation structure, in which a connection passage for connecting a first space that is an operating space of an armature and a second space that is a lower space of a bobbin is formed on a bottom surface of a housing. The second space of the bobbin is connected with an outer space of the housing by a communication path. Accordingly, by connecting the first space that is the operating space of the armature with an outer space of the solenoid valve, a negative pressure can be avoided in the operating space of the armature, thus preventing the performance of the armature from being deteriorated.

5 Claims, 7 Drawing Sheets

(51) Int. Cl.
*F04B 39/10* (2006.01)
*F16K 3/24* (2006.01)
(52) U.S. Cl.
CPC ...... *F16K 31/0613* (2013.01); *F16K 31/0693* (2013.01)
(58) Field of Classification Search
CPC ...... F04B 35/045; F04B 39/10; H01F 27/025; H01F 7/06
USPC .............................. 137/625.69; 251/129.15
See application file for complete search history.

(56) References Cited

U.S. PATENT DOCUMENTS

| | | | | |
|---|---|---|---|---|
| 6,213,445 | B1* | 4/2001 | Sato | F16K 11/105 |
| | | | | 137/909 |
| 9,523,437 | B2* | 12/2016 | Pott | F16K 31/0665 |
| 2011/0049405 | A1* | 3/2011 | Bill | H01F 7/127 |
| | | | | 251/129.15 |
| 2013/0168584 | A1* | 7/2013 | Tung | F16K 1/42 |
| | | | | 251/129.15 |
| 2014/0318649 | A1* | 10/2014 | So | F16K 31/0668 |
| | | | | 137/599.14 |
| 2014/0326912 | A1* | 11/2014 | Da Pont | F16K 31/0675 |
| | | | | 251/129.15 |
| 2016/0136655 | A1* | 5/2016 | Peterson | F16K 31/0644 |
| | | | | 137/544 |
| 2017/0059056 | A1* | 3/2017 | Kim | F01L 1/34 |

\* cited by examiner

SOLENOID VALVE HAVING VENTILATION STRUCTURE

CROSS-REFERENCE TO RELATED APPLICATION

This application claims priority to Korean Patent Application No. 10-2017-0069457 filed on Jun. 5, 2017, the disclosure of which is incorporated herein by reference in its entirety.

TECHNICAL FIELD

The present disclosure relates to a solenoid valve having a ventilation structure, and more particularly, to a solenoid valve having a ventilation structure capable of preventing negative pressure from occurring in the inner space of a solenoid valve.

RELATED ART

A solenoid valve opens and closes a valve by an electromagnetic force generated by supplying a current to a coil. It is widely used in the machinery field such as aircraft and automobile due to diverse utility such as a proportional control through a current control supplied to the coil as well as a simple opening/closing control.

In the solenoid valve, a coil assembly and a core are embedded inside a housing, an armature and a core plate (a magnetic body) are inserted into the inside of the core, a rod is inserted into a central aperture of the core plate, and the armature and a spool for opening and closing a flow path contact with both ends of the rod, respectively. The spool is inserted into the inside of a cylindrical flange on which a plurality of flow path apertures are formed; and one end of which contacts with the rod and the other end of which is supported by a return spring. Accordingly, when a current is supplied to the coil of the coil assembly to form a magnetic field, the armature is displaced toward the core plate, the rod is pushed by the armature, and the rod pushes the spool, thus performing a flow path control while opening and closing the plurality of flow path apertures formed in a flange.

Meanwhile, when the solenoid valve operates, the oil inside the flange can penetrate through the minute gap between the parts to the operating space of the armature, and when the armature is operated in the oil penetrated state, a negative pressure may be formed in the operating space of the armature. There has been a problem in that the negative pressure affects the operation of the armature and the spool, thus adversely affecting the flow path control performance of the solenoid valve.

The above information disclosed in this section is merely for enhancement of understanding of the background of the disclosure and therefore it may contain information that does not form the prior art that is already known to a person of ordinary skill in the art.

SUMMARY

An object of the present disclosure is to provide a solenoid valve having a ventilation structure, which provides a connection passage for connecting an operating space of an armature inside a core with an outside of a housing, thus preventing the deterioration of the performance of the solenoid valve due to negative pressure by avoiding the formation of the negative pressure in the operating space of the armature.

The solenoid valve in accordance with the present disclosure for achieving the object may include a housing, an armature inside the housing, a core that surrounds the armature, and a bobbin that surrounds the core and is wound by a coil. A first space may be formed in an armature region between the armature and a bottom surface of the housing, the core and the bottom surface of the housing may tightly abut in a core region between the core and the bottom surface of the housing, and a second space may be formed in a bobbin region between the bobbin and the bottom surface of the housing. Additionally, at least one communication path for communicating the second space and an outer space of the housing may be formed in the bobbin region, and a connection passage for connecting the second space of the bobbin region from the first space of the armature region through the core region may be formed on the bottom surface of the housing.

In addition, the connection passage may be formed in the straight line or the curved groove that is concavely formed on the bottom surface of the housing. Further, the connection passage may include a first connection passage extended in the radial direction from the armature region toward the core region, a second connection passage extended in the circumferential direction from the first connection passage inside the core region, and a third connection passage extended in the radial direction from the second connection passage toward the bobbin region.

The first connection passage, the third connection passage, or both may be formed at the locations farthest from the at least one communication path with respect to the circumferential direction in the core region and the bobbin region, respectively, and the second connection passage for connecting the first connection passage with the third connection passage. The second connection passage may further include a first circumferential passage connected to the first connection passage and disposed at a first radial position, a second circumferential passage connected to the third connection passage and disposed at a second radial position that is radially more outward than the first radial position, and a radial passage for connecting the first circumferential passage and the second circumferential passage.

Alternatively, the first connection passage, the third connection passage, or both may be formed at the locations farthest from the at least one communication path along the circumferential direction in the core region and the bobbin region, respectively, and the second connection passage for connecting the first connection passage with the third connection passage may be formed to have the circular shape that encircles along the circumferential direction of the core region once or in plural times.

In addition, the at least one communication path may include an engaging aperture into which a hook of a contact guide mounted on a bottom outside surface of the housing is inserted and coupled. The at least one communication path may also include a power connection aperture into which a terminal support member for holding and supporting a contact flag connected to the coil is inserted. The connection passage may be formed to have the cross-sectional shape in which a top opening is wider than a bottom edge.

According to the present disclosure as described above, there is provided a solenoid valve having the connection passage formed on the bottom surface of the housing as the ventilation structure for connecting the operating space of the armature inside the core and the empty space outside the core. The empty space outside the core may be connected with the external ambient space of the housing through the power connection aperture and the contact guide engaging aperture formed to be penetrated on the bottom surface of the housing. As described above, the operating space of the armature may communicate with the external space (atmosphere) of the housing of the solenoid valve, thus preventing the negative pressure from being formed in the operating space of the armature. Accordingly, the operation of the armature may not be reduced by the negative pressure, the location control of the spool is accurately performed and the flow path control is accurately performed, thus enhancing the performance of the solenoid valve.

DETAILED DESCRIPTION

Various modifications and various embodiments may be made in the present disclosure, so that specific exemplary embodiments are illustrated in the drawings and described in detail. It should be understood, however, that it is not intended to limit the present disclosure to the particular disclosed forms, but includes all modifications, equivalents, and alternatives falling within the sprit and technical scope of the present disclosure. The thickness of the lines or the size of the elements illustrated in the attached drawings can be exaggerated for clarity and convenience of explanation.

In some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items. The same reference numerals refer to the same components throughout the disclosure.

In addition, the following terms are defined in consideration of the functions of the present disclosure, and this can be changed according to the intention of the user and the operator or the cases. Accordingly, the definitions of these terms should be made based on the contents throughout this specification.

Hereinafter, the preferred embodiments in accordance with the present disclosure will be described in detail with reference to the accompanying drawings.

Figure 1:
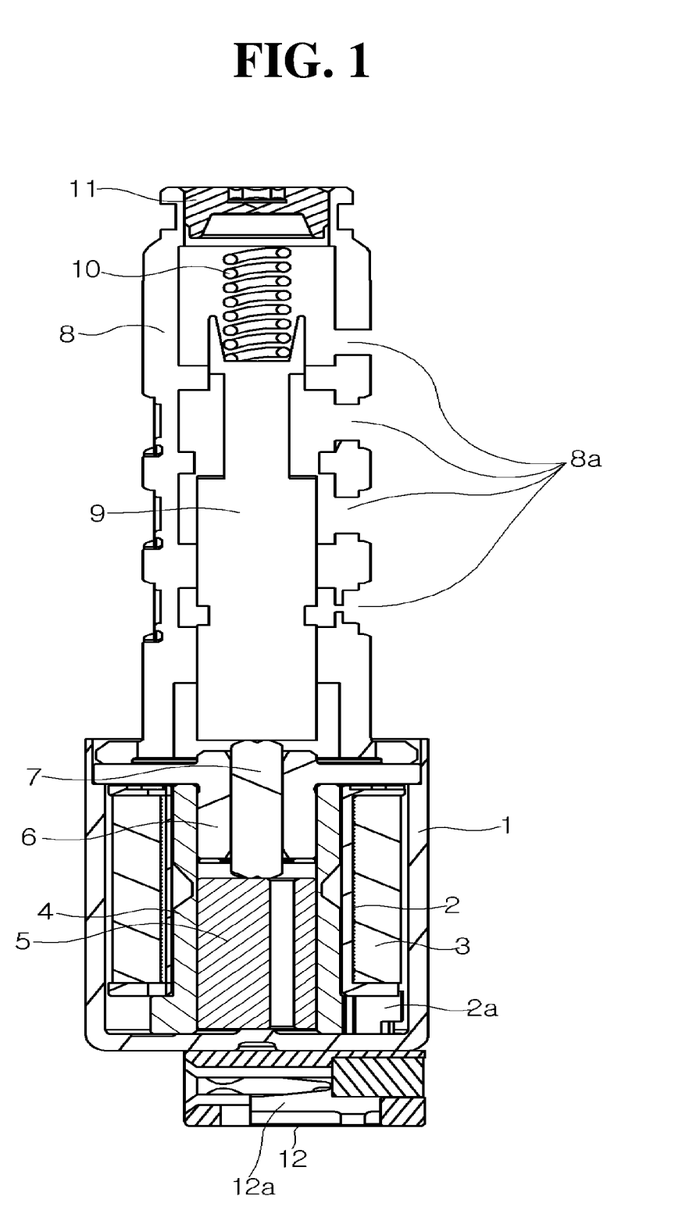
FIG. 1 is a longitudinal cross-sectional view of a solenoid valve to which the present disclosure is applied.
Figure 2:
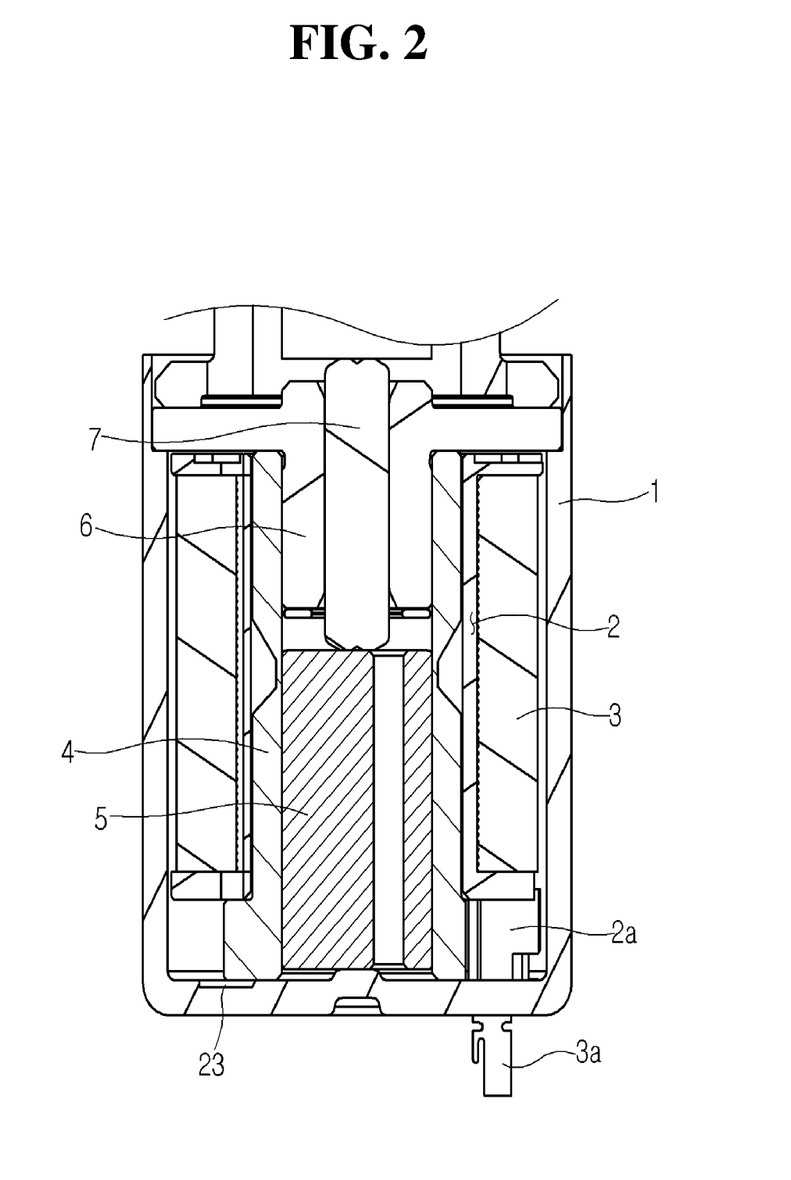
FIG. 2 is an enlarged view of a magnetic path portion of the solenoid valve.

FIG. 1 is a longitudinal cross-sectional view of a solenoid valve to which the present disclosure is applied, and FIG. 2 is an enlarged view of a magnetic path portion of the solenoid valve. The solenoid valve is divided into a magnetic path portion for generating a driving force of an armature 5 by the magnetic force and a flow path portion for controlling a flow path by embedding a spool 9. The magnetic path portion may be formed by inserting a coil assembly, a core 4, the armature 5, a core plate 6, and a rod 7 into a housing 1.

The coil assembly may include a coil 3 that is wound around a cylindrical bobbin 2. The core 4 may be inserted into the bobbin 2 as a cylindrical soft magnetic body. The armature 5, which is a magnetic body, may be first inserted into the core 4, and then the central cylindrical portion of the core plate 6, which is also a magnetic body, may be inserted. The space between one end portion of the core plate 6 and the bottom surface of the housing 1 may be the operating space of the armature, and the armature 5 may be moved axially (up and down directions in FIG. 2) in the operating space. The armature 5 may be formed with a through-hole (e.g., aperture) in the axial direction, such that air communication is made between the upper space and lower space of the armature 5. The rod 7 may be inserted into the central aperture of the core plate 6 and one end thereof may abut the armature 5.

The flow path portion may include a cylindrical flange 8 fixed to one end portion of the housing 1 and abut one face of the core plate 6, the spool 9 disposed within the flange 8 and one end of which abuts the rod 7, a spring 10 for generating a returning force by elastically supporting the spool 9, and an adjust screw 11 that is screwed to one end portion of the flange 8 to adjust the spool support strength of the spring 10. A plurality of flow path apertures 8a may be formed on the side surface of the flange 8, and a land for opening and closing the flow path apertures 8a may be formed on the spool 9.

Accordingly, when a current is supplied to the coil 3 to form a magnetic path through the housing 1, the core plate 6, and the core 4, the armature 5 may be displaced toward the core plate 6 side, and the armature 5 may push the spool 9 through the rod 7 to displace the location of the spool 9 to control the flow path while the flow path apertures 8a are opened and closed. During the operation, the amount of movement of the armature 5 may be controlled by adjusting the magnitude of the supply current to adjust the magnitude of the magnetic force, and thereby, by controlling the location of the spool 9, the magnitude of the fluid pressure supplied to the fluid path may be controlled. In the above-described solenoid valve, the present disclosure may include a connection passage 20 for connecting the inner space of the core 4 and the outer space of the core 4.

Figure 3:
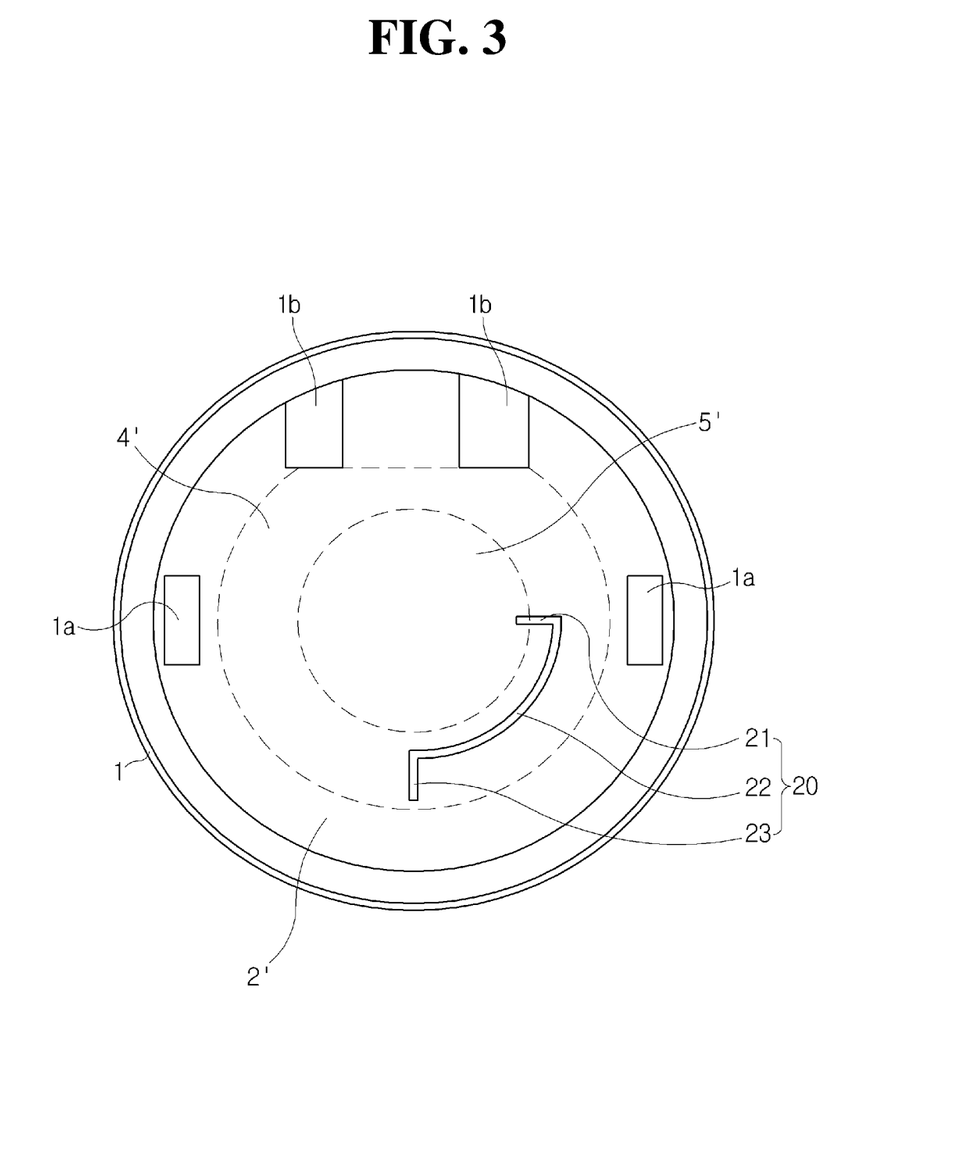
FIG. 3 illustrates the shape that a connection passage is formed on a bottom surface of a housing as a first exemplary embodiment of the present disclosure.

FIG. 3 illustrates a bottom surface of the housing 1, and a reference numeral 2' refers to a bobbin region facing (e.g., corresponding to) the bobbin 2, a reference numeral 4' to a core region facing the core 4, and a reference numeral 5' to an armature region facing the armature 5. As illustrated in FIG. 2, a second space may be formed as a cavity between the bobbin 2 and the housing 1 in the bobbin region 2'. The core 4 and the housing 1 may tightly abut each other in the core region 4' and a first space may be also formed as an empty space (this space may be increased or decreased by the movement of the armature 5) between the armature 5 and the housing 1 in the armature region 5'.

The connection passage 20 may be a groove concavely formed on the bottom surface of the housing 1 and connected as one groove from the armature region 5' to the bobbin region 2' through the core region 4'. Accordingly, the operating space of the armature inside the core 4 and the outer space (meaning the space of the bobbin region 2') of the core 4 may be communicated with each other by the connection passage 20.

Meanwhile, at least one communication path for connecting the second space of the bobbin region 2' and the outer space of the housing 1 may be present in the bobbin region 2' of the bottom surface of the housing 1. The at least one communication path may be an engaging aperture 1a and/or a power connection aperture 1b, which will be described below.

The engaging aperture (e.g., coupling aperture) 1a may be formed to be penetrated on both the left and right sides of the bobbin region 2' of the bottom surface of the housing 1, and the engaging aperture 1a may be the holes into which the hook of a contact guide 12 that is mounted on the bottom outside surface of the housing 1 may be inserted and hooked. The contact guide 12 may be a connector that a contact fork 12a (referring to FIG. 1), which is the terminal through which the operating current is entered, is embedded.

The power connection aperture 1b may be a pair of apertures formed at one side portion (the middle portion between both side engaging apertures 1a) of the bobbin region 2', and a terminal supporting member 2a for holding and supporting one end of a contact flag 3a (referring to FIG. 2; e.g., a connection terminal) may be inserted into the power connection aperture 1b. The contact flag 3a and the end portion of the coil 3 that is wound around the bobbin 2 may be connected to each other within the terminal supporting member 2a. The contact flag 3a may be contacted with the contact fork 12a in the contact guide 12 to constitute a power supply path for the coil 3.

As described above, at least one engaging aperture 1a, at least one power connection aperture 1b, or both may be formed in the bobbin region 2' of the bottom surface of the housing 1, respectively, and a gap may be present between the engaging aperture 1a and the hook of the contact guide 12 inserted therein, and a gap may be also present between the power connection aperture 1b and the terminal supporting member 2a inserted therein. By this configuration, the empty space of the bobbin region 2' may communicate with the outer space of the housing 1, that is exposed to the atmosphere, through the gaps at the engaging aperture 1a and/or the power connection aperture 1b. The armature region 5' inside the core 4, that is defined as the first space, may be therefore communicated with the ambient space outside the solenoid valve through the connection passage 20 and the second space of the bobbin region 2', and the gaps at the engaging aperture 1a and/or the power connection aperture 1b.

Accordingly, an air may be communicated between the first space as the operating space of the armature and the atmosphere, such that no negative pressure is formed in the operating space of the armature. Further, the movement of the armature may not be hindered by the negative pressure and the operation of the spool 9 may be accurately controlled, thus accurately controlling the flow path of the solenoid valve. Consequently, the performance of the solenoid valve may be enhanced.

Meanwhile, the connection passage 20 may be most simply formed in the straight line shape connecting the first space of the armature region 5' and the second space of the bobbin region 2' with the straight line. However, as described above, when the connection passage 20 is simply formed in the straight line shape, there may be a greater possibility that external foreign matter permeating into the second space of the bobbin region 2' may permeate into the first space of the armature region 5' through the connection passage 20. When the foreign matter permeates into the first space of the armature region 5', the movement of the armature 5 may be obstructed, and the performance of the solenoid valve may be adversely affected.

Therefore, in order to prevent the foreign matter from permeating into the first space of the armature region 5', the connection passage 20 may be formed in various shapes as illustrated in FIGS. 3 to 6. The connection passage 20 may include, as illustrated in FIG. 3 (a first exemplary embodiment), a first connection passage 21 formed in the radially-oriented straight line shape from the armature region 5' to the core region 4', a second connection passage 22 extending in the circumferential direction thereof by 90° from the first connection passage 21 in the core region 4', and a third connection passage 23 formed in the radially-oriented straight line shape from the second connection passage 22 to the bobbin region 2' out of the core region 4'.

Accordingly, the armature region 5' and the bobbin region 2' may be connected to each other by the first to third connection passages 21, 22 and 23, and thereby, the communication between the armature region 5' and the external air of the housing 1 may be possible, thus preventing the formation of negative pressure (e.g., vacuum). The second connection passage 22 may be preferably formed to be extended away from the engaging aperture 1a and the power connection aperture 1b when extended in the circumferential direction thereof from the first connection passage 21. In this way, the third connection passage 23 may be disposed distant from the engaging aperture 1a and the power connection aperture 1b. This may increase the length of the air communication path, thus maximally decreasing the possibility of permeation of external foreign matter through the air communication path. In addition, since the shapes that are bent at about right angle may be formed between the first connection passage 21 and the second connection passage 22 and between the second connection passage 22 and the third connection passage 23, the foreign matter may be caught on a bending portion during permeation to enhance the effectiveness of suppressing the foreign matter permeation.

Figure 4:
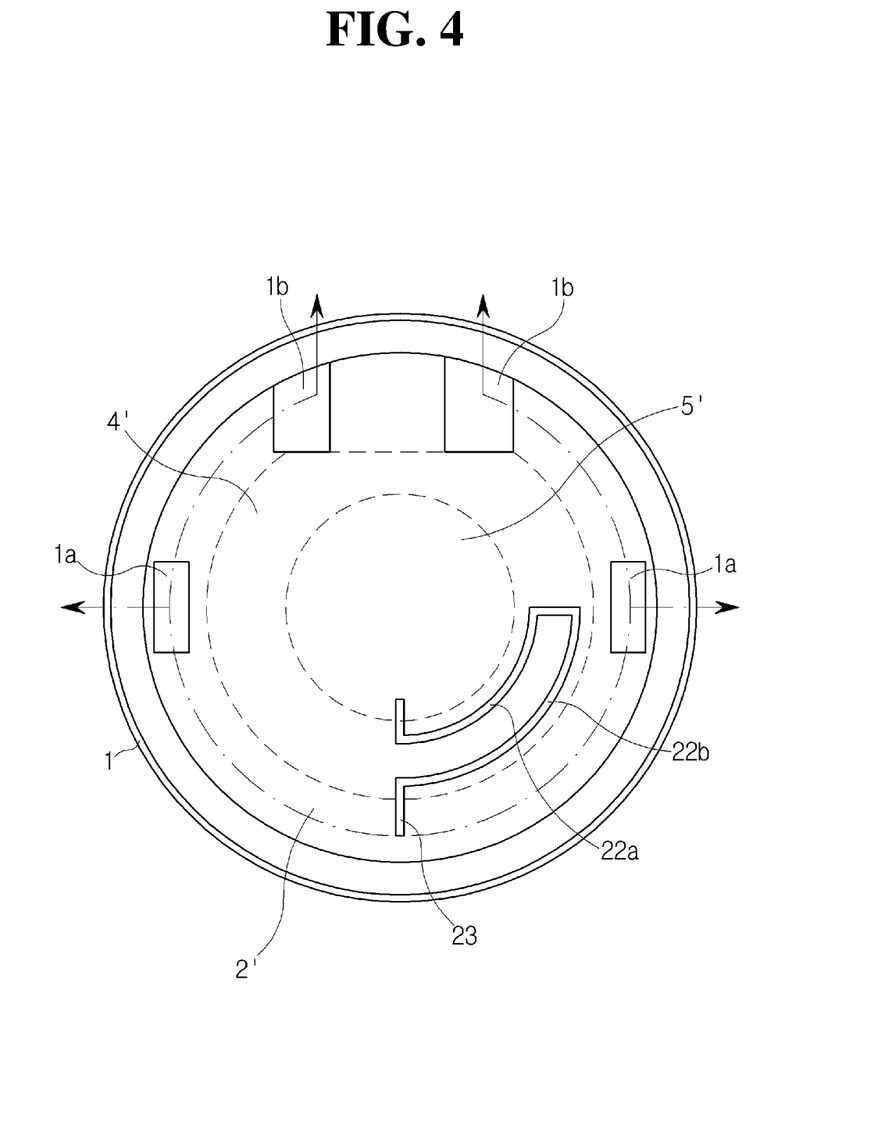
FIG. 4 illustrates a second exemplary embodiment of the present disclosure.

FIG. 4 illustrates a second exemplary embodiment of the connection passage 20. In the exemplary embodiment, the first connection passage 21 and the third connection passage 23 may be both formed at the locations disposed distant from the engaging aperture 1a and the power connection aperture 1b in the circumferential direction thereof. In this exemplary embodiment, the second connection passage 22 for connecting the first connection passage 21 and the third connection passage 23 may include two circumferential passages, which are disposed inside the core region 4', that is, a first circumferential passage 22a formed in the direction away from the third connection passage 23 on the end portion of the first connection passage 21 and a second circumferential passage 22b formed in the direction toward the third connection passage 23, and a radially-oriented passage (no reference numeral) for connecting the first circumferential connection passage 22a and the second circumferential passage 22b.

As described above, the second connection passage 22 may include two passages spaced apart from each other in the radial direction, thus increasing the length thereof, and additionally, a bending portion may be present on both ends of the radially-oriented passage for connecting the first circumferential passage 22a and the second circumferential passage 22b to increase the number of bending portions (four locations in total) of the entire connection passage 20, thus further enhancing the effectiveness of preventing the external foreign matter from permeating in. In addition, the third connection passage 23 may be formed at the location disposed distant from the engaging aperture 1a and the power connection aperture 1b in the circumferential direction thereof to increase the length of the path from the connection passage 20 to the engaging aperture 1a and the power connection aperture 1b, thus making the permeation of the foreign matter more difficult.

Figure 5:
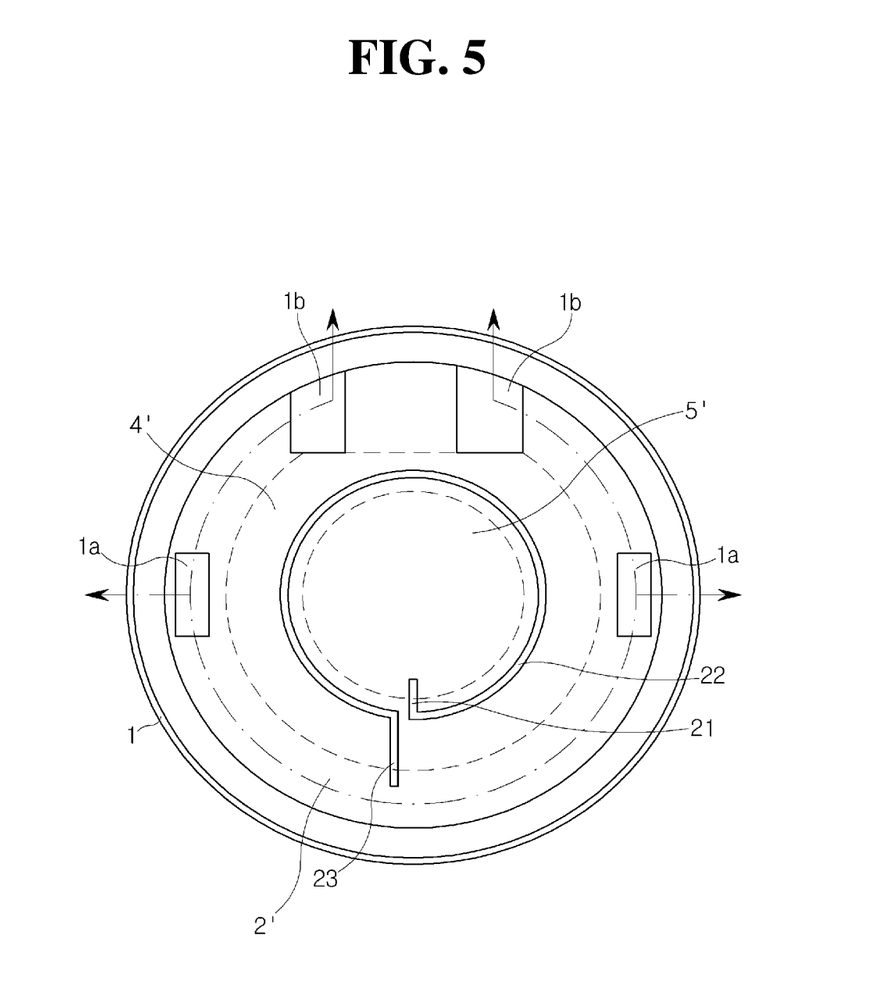
FIG. 5 illustrates a third exemplary embodiment of the present disclosure.
Figure 6:
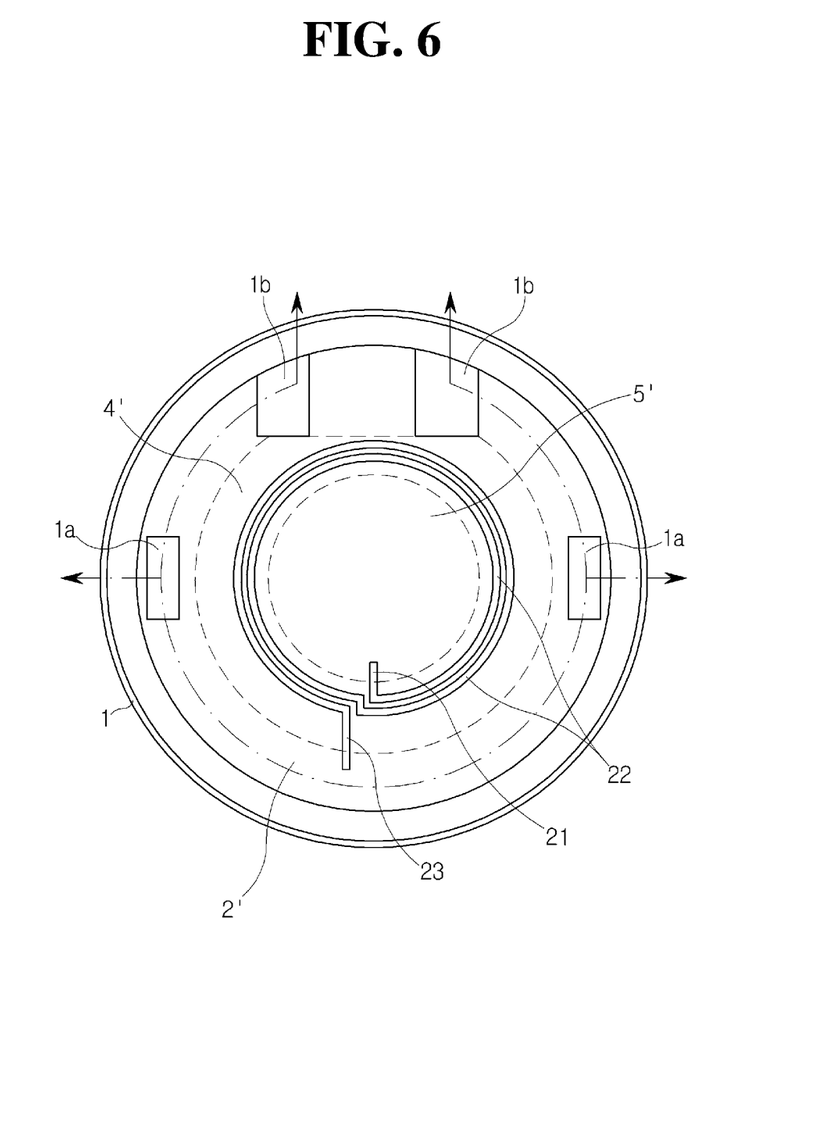
FIG. 6 illustrates a fourth exemplary embodiment of the present disclosure.

In third and fourth exemplary embodiments illustrated in FIGS. 5 and 6, in order to further increase the length of the connection passage 20, the second connection passage 22 may be formed in a circular shape across the entire core region 4' along the circumferential direction thereof. The locations of forming the first connection passage 21 and the third connection passage 23 may be the same as those of the second exemplary embodiment illustrated in FIG. 4, and the effect based on the locations may be also the same.

However, in the third embodiment, the second connection passage 22 may be formed in the shape that encircles the core region 4' once, while in the fourth exemplary embodiment, the second connection passage 22 may be formed in the shape that encircles the core region 4' twice. Accordingly, in the fourth exemplary embodiment, the length of the connection passage 20 may be further increased, and as the length thereof is increased, the effectiveness of preventing the external foreign matter from permeating may be further increased.

Figure 7A:
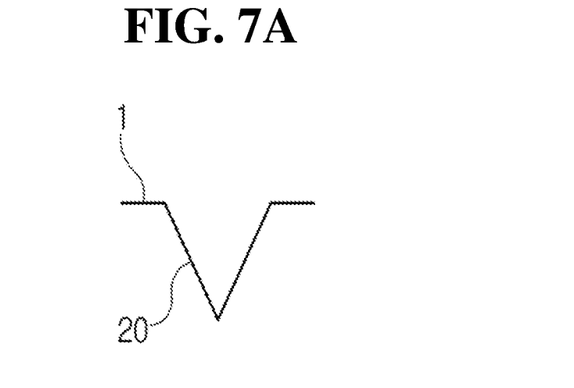
FIGS. 7A to 7C illustrate cross-sectional shapes of the connection passage.
Figure 7B:
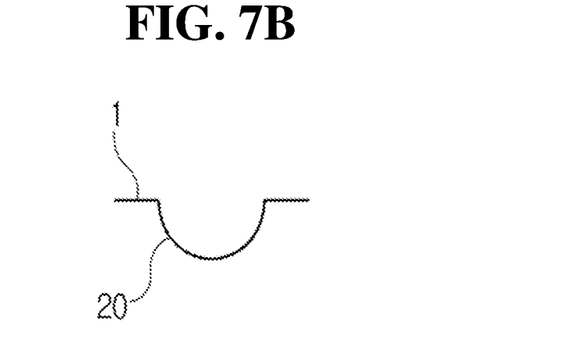
Figure 7C:
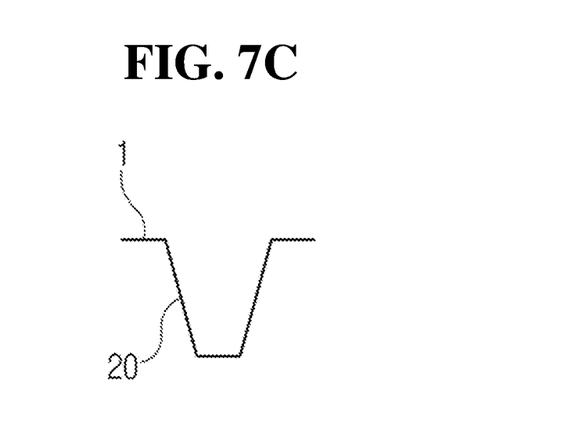

FIGS. 7A-7C illustrate the cross-sectional shapes of the connection passage 20. FIG. 7A is a view that the connection passage 20 is formed in an inverted triangle shape having a sharp bottom portion, FIG. 7B is a view that the connection passage 20 is formed in the semicircular shape, and FIG. 7C is a view that the connection passage 20 is formed in a reversed trapezoid shape having a narrow bottom portion. As described above, the connection passage 20 may be formed in various cross-sectional shapes, but it is preferable that the connection passage 20 is formed in the shape that has a narrower bottom width than the top width, as it can be formed through a press process which may simplify the manufacturing and reduce the cost.

Meanwhile, the depth of the connection passage 20 may be preferably 10% or less of the thickness of the housing 1. This is because as the depth of the connection passage 20 increases, the amount of mass of the housing 1 forming the magnetic path decreases to adversely affect the formation of the magnetic force. In view of the above, when the connection passage 20 is formed under the above-described conditions, it may be possible to form the air communication path for preventing the negative pressure without reducing the magnetic force.

As described above, although the present disclosure has been described in connection with the exemplary embodiments illustrated in the drawings, these are merely examples and it will be understood by those skilled in the art that various modifications and equivalent embodiments are possible. Accordingly, the technical scope of the present disclosure should be defined by the following claims.

What is claimed is:

1. A solenoid valve, comprising:
a housing;
an armature disposed within the housing;
a core that surrounds the armature; and
a bobbin that surrounds the core and is wound by a coil,
wherein a first space is formed in an armature region between the armature and a bottom surface of the housing, the core and the bottom surface of the housing tightly abut in a core region between the core and the bottom surface of the housing, and a second space is formed in a bobbin region between the bobbin and the bottom surface of the housing,
wherein at least one communication path for communicating the second space and an outer space of the housing is formed in the bobbin region,
wherein a connection passage for connecting the second space of the bobbin region and the first space of the armature region through the core region is formed on the bottom surface of the housing, and
wherein the connection passage comprises:
a first connection passage extended in a radial direction from the armature region toward the core region;
a second connection passage extended in a circumferential direction from the first connection passage inside the core region; and
a third connection passage extended in the radial direction from the second connection passage toward the bobbin region,
wherein the first connection passage, the third connection passage, or both are disposed farthest from the at least one communication path with respect to the circumferential direction in the core region and the bobbin region, respectively, and
wherein the second connection passage for connecting the first connection passage and the third connection passage comprises:
a first circumferential passage connected to the first connection passage and disposed at a first radial position;
a second circumferential passage connected to the third connection passage and disposed at a second radial position that is radically outside of the first radial position; and
a radial passage for connecting the first circumferential passage and the second circumferential passage.

2. The solenoid valve of claim 1, wherein the connection passage is formed in a straight line or a curved groove that is concavely formed on the bottom surface of the housing.

3. The solenoid valve of claim 1, wherein the at least one communication path comprises an engaging aperture into which a hook of a contact guide mounted on a bottom outside surface of the housing is inserted and coupled.

4. The solenoid valve of claim 1, wherein the at least one communication path comprises a power connection aperture into which a terminal supporting member for holding and supporting a contact flag connected to the coil is inserted.

5. The solenoid valve of claim 1, wherein the connection passage is formed to have a cross-sectional shape having a top width that is wider than a bottom width.

* * * * *